Aug. 25, 1953   J. E. SOCKE   2,649,749
APPARATUS FOR SOLDERING SIDE SEAMS OF CANS
Filed April 12, 1949   3 Sheets-Sheet 1

INVENTOR.
John E. Socke
BY Charles H. Gunn
Ivan D. Thornburgh
ATTORNEYS

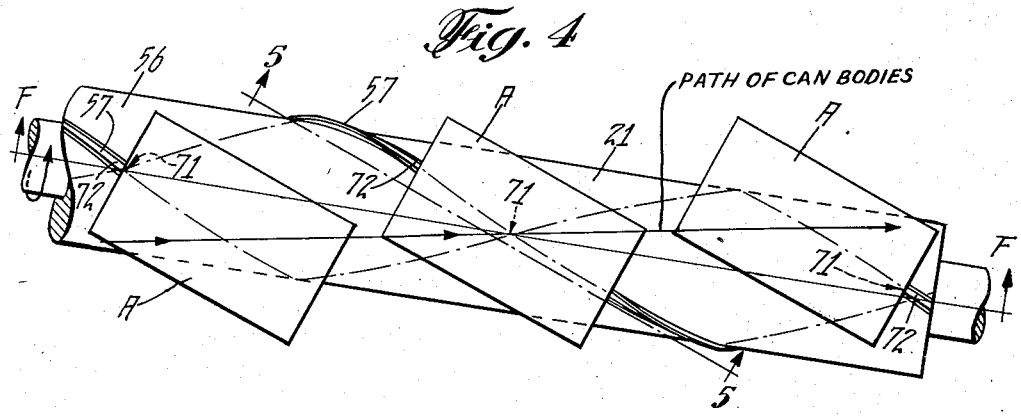
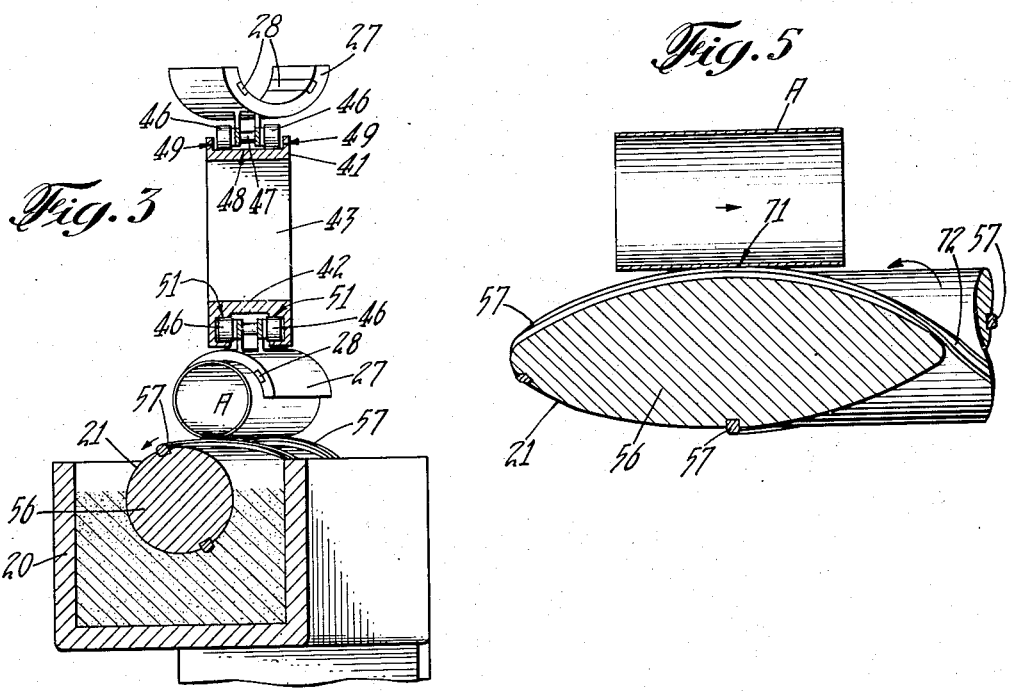
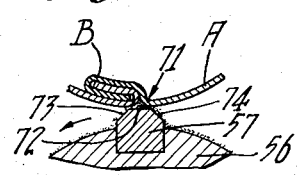

Aug. 25, 1953  J. E. SOCKE  2,649,749
APPARATUS FOR SOLDERING SIDE SEAMS OF CANS
Filed April 12, 1949  3 Sheets-Sheet 3
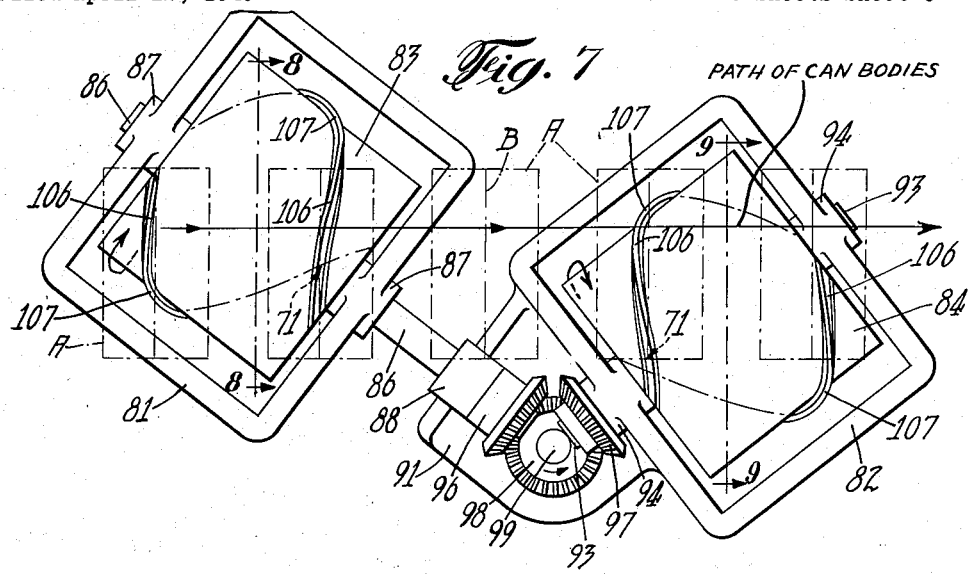
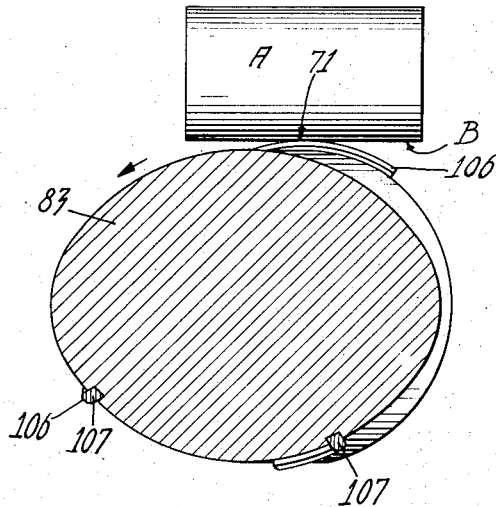
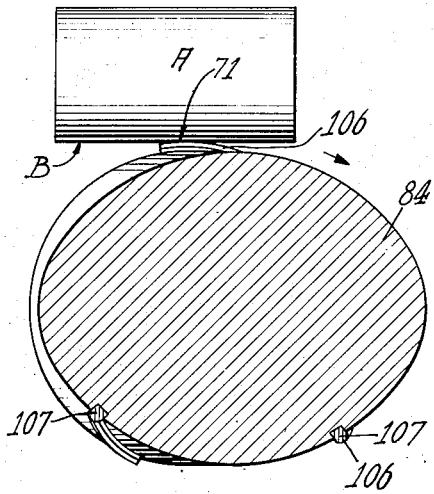
INVENTOR.
John E. Socke
BY Charles H. Lune
Ivan D. Thornburgh
ATTORNEYS Patented Aug. 25, 1953

2,649,749

UNITED STATES PATENT OFFICE 2,649,749

APPARATUS FOR SOLDERING SIDE SEAMS OF CANS

John E. Socke, Pelham Manor, N. Y., assignor to American Can Company, New York, N. Y., a corporation of New Jersey Application April 12, 1949, Serial No. 87,012

6 Claims. (Cl. 113—62)

This invention relates generally to a method of and apparatus for applying liquid material in a narrow band or stripe to moving articles and has particular reference to the application of molten solder to the side seams of tubular articles such as can bodies in just sufficient quantities to properly bond the seam parts together without undue excess solder overlapping the marginal edges of the seams.

It is well known in the art that application of liquid material to moving articles may be effected by transferring the material from a bath or tank to the articles by means of a roll, disc, or wheel which engages the article in a rolling or a wiping action. A well known example of such application is the soldering of side seams of metal can bodies wherein rotating solder rolls, partially submerged in a bath of molten solder, raise the solder in a film and apply it to the side seams of passing can bodies. The action is that of wiping the solder into the seam. However, some of this solder is also applied to the marginal areas of the can bodies adjacent the seam where it is not needed, resulting in a considerable waste of solder, reducing the area of the body available for lithographing, and also detracting from the appearance of the can.

Furthermore, by this prior method solder is frequently scooped or scraped off the rolls by the leading edges of the can body seams and enters the bodies. There it may remain to contaminate the product packed subsequently in the completed cans. Furthermore, if the scooped solder remains at the edge of a can body, it may interfere with efficient performance of subsequent can making operations. For instance, this excessive solder at the edge of a body has sometimes destroyed the effectiveness of the can end seam and caused spoilage of the packed product.

It is therefore an object of this invention to avoid the above mentioned disadvantages of prior methods and apparatus in this art by the use of a method and means which minimizes the spread of solder or other liquid along the marginal edges of the side seam anad also at the leading edge of the side seam of a can body, or other article.

Another object of the invention is the application of the liquid to the seam at a point of application which has relative movement longitudinally of the can body, or other article and angularly relative to the movement of the body so as to wipe a predetermined quantity of the liquid into the seam to properly flow the liquid into the spaces between the seam parts.

A further object of the invention is the application of the liquid material along a surface of the article in one direction while moving the applicator and the liquid material thereon in a second direction, and while moving the article in a third direction, angularly disposed relative to the first and second mentioned directions to properly wipe the liquid into the seams.

Still another object of the invention is the application of the liquid material to the seam in such a manner that the direction of travel of the liquid is away from both ends of the seam so that scooping or throwing of the liquid into the interior of the can or other open article is prevented, thereby maintaining the interior of the can or other article free from particles or pellets of the liquid.

A still further object of the invention is the provision of a liquid applying roller of a practical diameter and having a narrow helical projection with a long lead so as to present to the side seam of a can body in substantial parallelism therewith a long arc capable of carrying to the seam a predetermined quantity of the liquid without danger of a major portion of the liquid draining away from the roller.

Another object is the provision of such a method and apparatus which is particularly adapted to the high speed travel of can bodies through the machine while at the same time permitting of a slow speed liquid applying operation on the faster traveling bodies so as to insure a predetermined application of the liquid to the bodies.

Numerous other objects and advantages of the invention will be apparent as it is better understood from the following description, which, taken in connection with the accompanying drawings, discloses a preferred embodiment thereof Referring to the drawings:

Fig. 3 is an enlarged vertical section through the apparatus taken substantially along the broken line 3—3 in Fig. 2 with parts broken away;

Fig. 4 is an enlarged fragmentary and schematic plan view of a portion of the apparatus shown in Fig. 1 with parts broken away;

Fig. 5 is a vertical section taken substantially along the line 5—5 in Fig. 4;

Fig. 6 is an enlarged transverse section taken through a can body seam and a helical thread portion of the applicator;

Figure 1:
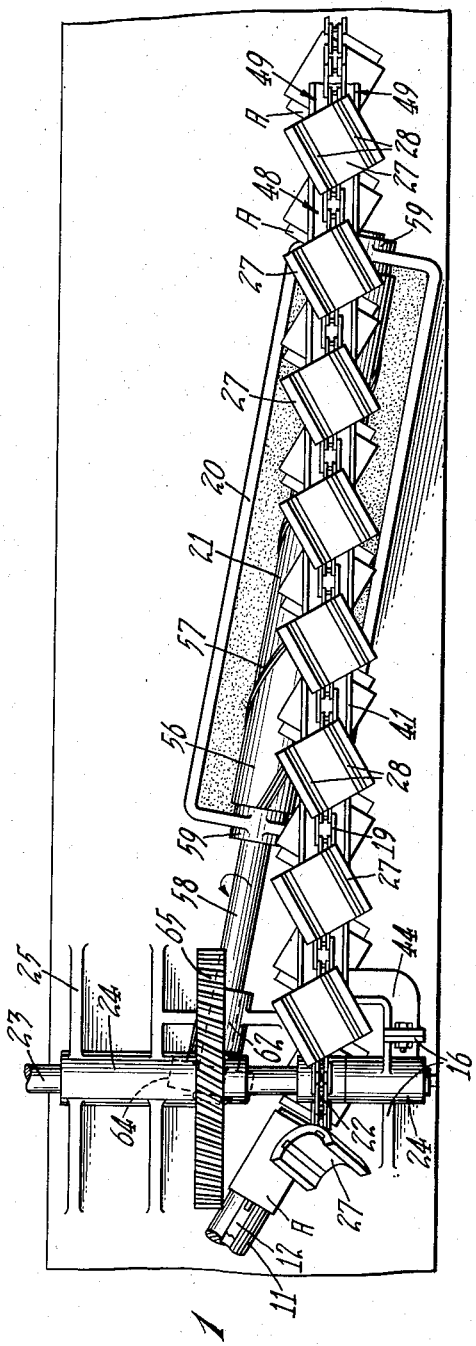
Figure 1 is a plan view of a preferred form of apparatus embodying the instant invention with parts broken away.

Fig. 7 is a plan view of an apparatus embodying a modified form of the invention; and Figs. 8 and 9 are enlarged vertical sections taken substantially along the lines 8—8 and 9—9, respectively, in Fig. 7, with a can body in place.

As a preferred or exemplary embodiment of the instant invention, the drawings disclose apparatus for soldering the side seams of tubular sheet metal can bodies A having interfolded or locked-edge side seams B of the well known lock seam variety, although the invention is equally well adapted to articles other than sheet metal can bodies, and to other forms of seams and to liquid materials other than solder.

In one form of the invention, disclosed in Figs. 1 to 6 inclusive, the can bodies A with their side seams B formed, but not soldered, are advanced to the apparatus along a cylindrical horn 11 (Figs. 1 and 2) having a reciprocable feed bar 12, which horn may be a part of a can bodymaker or other machine in which the can body or other article is produced.

The can bodies A are received from the horn 11 individually, in a curved or half mold lifter 13 disposed adjacent the terminal end of the horn 11. This lifter 13 is normally disposed in axial alignment with the terminal end of the horn and is mounted on a vertically movable stem 14 carried in a stationary bearing 15 formed on a bracket 16 secured to a base 17 which constitutes the main base for the instant machine. The lifter is raised through a lifting stroke and lowered through a return stroke in any suitable manner in time with the movement of the can bodies A along the horn 11. A bar magnet 18 secured in the lifter holds a received can body in place during its vertical movement to maintain the body side seam in the relation in which it is received from the horn 11. This is a conventional lifter device and forms no part of the instant invention.

When a can body A is received on the lifter 13, the lifter moves up through its lifting stroke and transfers the can body to a conveyor 19 which carries the body over a solder bath or tank 20 containing a supply of molten solder or other liquid in which a solder roll or helical applicator 21 rotates to effect a raising of the solder or other liquid in a film from the bath or tank to the side seam of the body.

Figure 2:
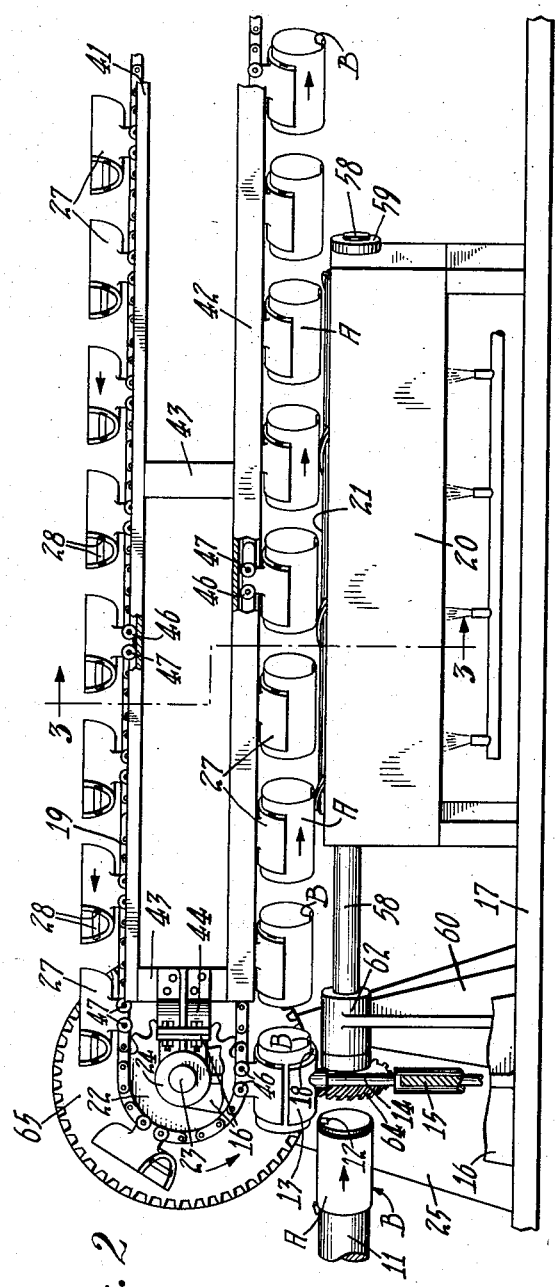
Fig. 2 is a side elevation of the apparatus shown in Fig. 1, with parts broken away.

The conveyor 19 comprises a horizontally disposed endless chain which operates over a pair of spaced sprockets 22, one of which is shown at the left in Figs. 1 and 2. These sprockets are mounted on rotatable shafts 23 which are journaled in bearings 24 formed in the bracket 16 and other brackets 25 which project up from the machine base 17. One of the shafts 23 serves as a driving shaft and is continuously rotated in any suitable manner in time with the intermittent travel of the bodies A along the horn 11.

At spaced intervals along the endless chain, the conveyor 19 carries curved or half mold cradles 27 which are spaced in such a manner as to co-operate with the lifter 13 to receive individual can bodies therefrom as the cradles pass around the sprocket 22 shown at the left in Figs. 1 and 2 in a counterclockwise direction and advance past the lifter.

Each cradle 27 is formed with walls which conform generally to a portion of the outer contour of the bodies A. In these walls, a plurality of bar magnets 28 are inserted to retain each can body within the cradle during its progress with the conveyor 19. The attraction of the plurality of magnets 28 in each cradle is greater than that of the single bar magnet 18 in the lifter 13. Consequently, when the lifter is moved downwardly through its return stroke after delivering a can body A to a cradle 27 the delivered can body remains in the cradle where the greater magnetic attraction holds it while the lifter with its weaker magnetic attraction is stripped from the lower side of the body.

Each cradle 27 is angularly disposed relative to the longitudinal path of the conveyor 19 and the can bodies temporarily retained in cradles 27 are therefore conveyed in the same angular position along the path of the conveyor.

In order to maintain the cradles 27 against lateral displacement during their travel with the conveyor 19, the upper and lower runs of the conveyor chain are guided and supported, respectively, in an upper guide 41 and a lower guide 42 formed in an open frame 43 suspended on brackets 44 secured to the bearing bracket 16 disposed at the ends of the conveyor.

Rollers 46, rotatably mounted on pins 47 projecting laterally from both sides of the conveyor chain (Figs. 2 and 3), ride in the guides 41 and 42, thus supporting the conveyor and the can held therein. As the conveyor passes over the upper guide 41 the rollers 46 bear on a lower channel wall 48 (see Fig. 3) while side channel walls 49 prevent excessive lateral movement of the conveyor. As the conveyor passes along the lower run, the rollers 46 ride along in opposed grooves 51 formed in the lower guide 42. Grooves 51 positively confine the vertical and lateral movements of the conveyor to within permissible limits. In this manner, the can bodies A are accurately held and conveyed along the lower run of the conveyor in their predetermined angular positions and in a straight path over the solder roll or applicator 21 with the side seams B of the bodies lowermost and adjacent the applicator.

The applicator 21 comprises a cylindrical body 56 having one or more raised helical or worm threads, ridges or projections 57. These threads may be separately formed and inserted in helical grooves in the body 56 (see Fig. 6) or they may be formed integrally with the body 56. The applicator is formed with trunnions 58 which are journaled in bearings 59, formed in opposite ends of the solder tank 20. The tank is mounted on the machine base 17.

One of the trunnions 58 projects beyond one of the bearings 59 and is journaled in a bearing 62 formed in a bracket 60 secured to the machine base 17 (see Figs. 1 and 2). A spiral gear 64 is keyed to the extremity of the trunnion 58 and meshes with a spiral gear 65 keyed to the conveyor sprocket shaft 23. By means of these meshing spiral gears, power is transmitted from shaft 23 to trunnion 58 to drive the helical applicator in timed relation with the conveyor 19.

While thus driven, the applicator raises a film of molten solder from the bath 20 and applies it to the seam of a passing can body with a movement diagonally across the seam and at a constantly changing point 71 of tangency or line of application (Figs. 4 and 6) between a land or flat face 72 of the thread 57 and the seam B. This point or line 71 of tangency is always located at the intersection of the side seam B and a vertical plane F—F (Fig. 4) which includes the axis of the solder roll 21. The point or line or narrow band of application 71 moves forward progressively and longitudinally along the seam B because of the combination of the relative dispositions and speeds of the applicator threads 57 and the seams B.

As shown in Fig. 4, the point of application 71 is always at the top of the land or flat face 72, but its relative movement on the body seam B (Fig. 4) is from the left to the right end of the seam (as viewed in Fig. 4) as the body moves across the applicator from left to right in this preferred illustration. It is to be noted that this relative movement of point 71 along the side seam is at an angle to the direction of the body movement. Both point 71 and the body seam B move longitudinally of the apparatus in the same direction, but at different velocities. Point 71 moves faster than the body seam B and may traverse all of the seam length in one complete revolution of the applicator, or in some cases may traverse only a part of the seam length in less than one complete revolution, as will be explained hereinafter.

To produce this effect, the angle at which the side seam is disposed to the axis of the applicator is made substantially the same as the angle of the thread 57 relative to the applicator axis. That is, the seam B is substantially in parallel alignment with a line or plane of tangency drawn through the point 71 longitudinally of the land 72. Thus with a practical size of solder roll, i. e. one having a comparatively small diameter, an extra long arc such as shown in Fig. 5 may be readily obtained for providing a substantial line contact between the solder and the side seam rather than a mere point contact, thus supplying sufficient solder to the seam for a long enough time with a slow ironing action to permit the solder to penetrate by capillary action, into the spaces between the seam parts to bond them together.

To obtain movement of the point of application over the full length of the seam in any desired time, the lead or helix angle of the thread is an important factor. Where the lead must be great, multiple threads may be utilized in order to accommodate more bodies B between the points of application 71 on a single thread. This is illustrated in Fig. 4 where two threads 57 are shown. The present invention therefore contemplates the use of one or more threads 57 dependent upon variation in factors such as production speed, length of seam, diameter of applicator and other factors which will be obvious from the present complete disclosure.

To insure the application of a narrow stripe of solder to the seam, the helical threads 57 are beveled at 73, 74 (Fig. 6) to reduce the land 72 to the minimum width consistent with an adequate application of solder. This minimum width is substantially the width of the soldered stripe, as shown in Fig. 6. The beveled surfaces 73, 74 also make obtuse angles with the land 72 thereby avoiding the possibility of scraping or cutting the seam with the helical thread.

A modified form of the instant invention is shown in Figs. 7, 8 and 9. The purpose of this modified form is to effect the application of solder longitudinally of a side seam B in the manner previously described, but with a point of application 71 traversing less than the full length of the seam and a second point 71 traversing the remainder of the seam length and in the opposite direction. As in the previously described applicator 21, each thread of these applicators operates upon alternate body seams B.

Referring to the portion of Fig. 7 shown at the left of the view, movement of the point 71 along the can body side seam B is from the top of the drawing toward the bottom. It should be noted that the rotation of the applicator is in a direction generally away from the upper or leading end of the seam as viewed in Fig. 7 so that scooping of solder is thereby avoided. This operation is repeated in the opposite direction on the seam at a succeeding station shown at the right in Fig. 7.

To effect this double application of solder to a single side seam, two baths or tanks of solder, 81 and 82, are provided, with solder rolls or applicators 83 and 84, respectively. Applicator 83 is formed with trunnions 86 journaled in bearings 87 formed in opposite ends of the tank 81 and in a bearing 88 formed in a bracket 91 which is formed integrally with the tank 82. The tanks 81 and 82 together with the bracket 91 may be secured to the base of the apparatus and may be substituted for the single bath 21 in the previously described exemplary embodiment of the invention.

In similar manner, applicator 84 is formed with trunnions 93 journaled in bearings 94 formed in opposite ends of the tank 82. The axes of the trunnions 86 and 93 lie in a common plane and converge at a point outwardly of and between the two baths. Near the point of convergence of these trunnions, a bevel gear 96 is keyed to one of the trunnions 86 and a second bevel gear 97 is keyed to one of the trunnions 93. Both of the bevel gears 96, 97 mesh with a common bevel gear 98 keyed to a vertical shaft 99 journaled in the bracket 91.

Shaft 99 may be mechanically connected to the conveyor sprocket shaft 23 (Fig. 1) by any suitable gear train which would provide the desired timed relation between the rotation of the applicators 83, 84 and the movement of the can bodies A in the straight line path over those applicators in a plane substantially tangent to the threads 107 at the points of application 71 on both applicators, as indicated in Fig. 7.

With the applicators 83, 84 thus driven in timed relation to the movement of the bodies A and the body seams B, the point of application 71 between each of lands or flat surfaces 106 of duplex threads 107 of the applicator 83, as viewed in Fig. 7, progresses from the upper end of the seam downwardly to a point beyond midway of the seam, the direction of rotation of the applicator and therefore the direction of movement of the solder as it is applied is generally diagonally across the seam and outwardly away from the leading can body edge at which application is started to prevent scooping of solder into the interior of the can body.

A conveyor, similar in structure and operation to that shown at 19 in Figs. 1 and 2, may be utilized in moving the bodies A in the path adjacent the applicators 83, 84 shown in Fig. 7. As each body A is thus conveyed from the applicator 83 toward the applicator 84, a portion of its seam B at the lower end of the body, as viewed in Fig. 7, is still not soldered. Soldering of the seams is then completed by the applicator 84 which rotates in a direction substantially at right angles to the rotation of the applicator 83 so that movement of the point of application 71 is upward and extends to beyond the midpoint of the seam thereby overlapping in some degree the solder applied by the applicator 83. Here again the direction of rotation of the applicator and the solder thereon is away from the can body edge at which application is started thus preventing the scooping of solder into the interior of the can body.

In Figs. 8 and 9, the movement of the point of application 71 is further clarified. In Fig. 8 the body A is moving away from the observer and the point 71 is moving toward the right as the land 106 moves toward the left. In Fig. 9 the body A is also moving away from the observer and the point 71 is moving from right to left in the direction opposite to the movement of the land 106.

As described above, the initial point of solder application is in each instance at a different end of the seam B, but the wiping action between the land 106 and the seam B at either initial point of application is generally diagonally across the seam and outwardly away from the leading end of the seam so that scooping of solder by the edge of the body A is impossible. Furthermore, the application of solder by the point 71 is terminated before reaching the opposite end of seam B in each application. Therefore, the possibility of scooping is avoided at both ends of the seam B.

Thus, by application of this modified form of the invention, as in the first described form, the possibility of scooping solder into the can body or upon either end of the seam is prevented and the interior portions of the can bodies are kept free of contamination or obstruction by particles of solder.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. In an apparatus for applying solder to the side seams of can bodies, the combination of a rotary applicator having a raised helical thread, means for supplying molten solder to said helical thread, conveyor means for moving can bodies in a predetermined path crossing the axis of said applicator at an angle with said helical thread greater than the angle of said thread relative to said axis of the applicator, said conveyor means retaining said can bodies thereon with the side seam of each body disposed at an angle to the axis of said applicator substantially the same as the angle of said helical thread relative to said axis of the applicator for receiving an application of solder from said helical thread at a point of tangency between said side seam and said helical thread, and drive means for rotating said applicator and moving said conveyor means in timed relation to advance said point of tangency and application of solder along said side seam as the can body moves along said predetermined path.

2. In an apparatus for applying solder to the side seams of can bodies, the combination of a rotary applicator having a raised helical thread, means for supplying molten solder to said helical thread, conveyor means for moving said bodies in a predetermined path crossing the axis of said rotary applicator at an angle thereto, said conveyor means holding each body thereon with its side seam substantially tangent to the thread at a point of application between said helical thread and said side seam and disposed in substantial parallelism with said thread at said point of application, and drive means for rotating said applicator and moving said conevyor means in timed relation to advance said point of application of solder along said side seam as the can body is advanced along said predetermined path.

3. In an apparatus for applying solder to the side seams of can bodies, the combination of a rotary applicator having a raised helical thread, means for supplying molten solder to said helical thread, a conveyor for moving said bodies in a predetermined path of travel adjacent said helical thread and across the axis of said applicator, said conveyor also retaining said bodies in spaced relation thereon with their side seams engaging said helical thread at a traveling point of tangency and angularly disposed relative to the axis of said applicator, each side seam receiving its application of solder from said thread as said point of tangency moves progressively along said side seam, and drive means for rotating said applicator and moving said conveyor and the can bodies thereon in timed relation to advance said point of tangency to apply solder along said side seam.

4. In an apparatus for applying solder to the side seams of can bodies, the combination of a rotary applicator having a raised helical thread, means for supplying molten solder to said helical thread, conveyor means for moving said bodies in a predetermined path adjacent said helical thread and across the axis of said applicator and for retaining said bodies with the side seam of each body advancing along said path in a plane lying across and substantially tangent to said thread, said side seam receiving an application of solder from said helical thread at the point of tangency between said side seam and said helical thread, and drive means for rotating said applicator and for moving said conveyor means to produce a relative advancement of said point of tangency along said seam and in the general direction of movement of said bodies but at a velocity greater than that of the bodies in their movement.

5. In an apparatus for applying solder to the side seams of can bodies, the combination of a pair of rotary applicators each having a raised helical thread, means for supplying molten solder to said helical thread, conveyor means for moving can bodies in a predetermined path crossing the axis of each of said applicators at an angle thereto and moving in a plane substantially tangent to the helical threads of both of said applicators, means for rotating said applicators so that a point of tangency between one of said helical threads and a said seam is advanced in said plane from one end of the seam to substantially midway along the seam and the point of tangency with the other thread is advanced similarly in an opposite direction from the other end of the seam, the direction of solder application at each end of the seam being outwardly and away from the seam and thereby preventing the projection of solder into the open ends of the bodies.

6. In an apparatus for applying solder to the side seams of can bodies, the combination of a plurality of rotary helical applicators, means for applying molten solder to each of said helical applicators, means for conveying can bodies in a predetermined path crossing the axis of rotation of each of said applicators at an angle thereto with the side seam of each body moving in a plane substantially tangent to said helical applicators, means for rotating said applicators so that a point of tangency between each of them and said seam is advanced in said plane along a portion of said seam and the direction of solder application at the ends of the seam is outwardly and away from each seam end, whereby said seam in passing successively over each of the applicators receives from it an application of solder over a predetermined portion of the full length of the seam so that complete application along the length of the seam is effected by the sum of the applications and projection of solder into the open ends of the bodies is prevented.

JOHN E. SOCKE.

References Cited in the file of this patent

FOREIGN PATENTS

| Number | Country | Date |
| --- | --- | --- |
| 388,075 | Germany | Jan. 8, 1924 |